United States Patent
Kim et al.

(10) Patent No.: US 7,349,434 B2
(45) Date of Patent: Mar. 25, 2008

(54) METHOD AND APPARATUS FOR TRANSMITTING DIFFERENT DATA TYPES IN A WIRELESS PACKET DATA COMMUNICATION SYSTEM

(75) Inventors: Dae-Gyun Kim, Songnam-shi (KR); Robert J Marks, Homewood, IL (US)

(73) Assignee: Samsung Electronics Co., Ltd (KR)

( * ) Notice: Subject to any disclaimer, the term of this patent is extended or adjusted under 35 U.S.C. 154(b) by 1004 days.

(21) Appl. No.: 10/382,453

(22) Filed: Mar. 6, 2003

(65) Prior Publication Data

US 2004/0017823 A1    Jan. 29, 2004

(30) Foreign Application Priority Data

Jul. 29, 2002   (KR) ............... 10-2002-0044753

(51) Int. Cl.
*H04J 3/16* (2006.01)
(52) U.S. Cl. .................. 370/469; 370/471
(58) Field of Classification Search ............ None
See application file for complete search history.

(56) References Cited

U.S. PATENT DOCUMENTS

| 6,400,724 | B1 * | 6/2002 | Yao ............... 370/429 |
| 6,507,582 | B1 * | 1/2003 | Abrol ............. 370/394 |
| 6,839,007 | B2 * | 1/2005 | Zhao et al. ........ 341/94 |
| 6,876,670 | B1 * | 4/2005 | Budrikis et al. ... 370/474 |
| 6,895,544 | B1 * | 5/2005 | Park et al. ........ 714/776 |
| 7,116,641 | B2 * | 10/2006 | Lim ............... 370/254 |
| 7,120,172 | B1 * | 10/2006 | Aribindi et al. ... 370/524 |
| 7,123,617 | B1 * | 10/2006 | Abrol ............. 370/394 |
| 2002/0001314 | A1 * | 1/2002 | Yi et al. ........ 370/469 |
| 2003/0002467 | A1 * | 1/2003 | Leung ............. 370/338 |
| 2003/0101404 | A1 * | 5/2003 | Zhao et al. ....... 714/755 |

* cited by examiner

*Primary Examiner*—Andrew C. Lee
(74) *Attorney, Agent, or Firm*—The Farrell Law Firm, PC (57) ABSTRACT

A method and apparatus for encapsulating a PDU in a wireless packet data communication system. In a system providing voice and high-rate packet data services, an LAC layer and an RLP layer generate SDUs of MuxPDU Type 1, 2, or 4 with signaling information and RLP_control information. A MAC layer determines whether to transmit the SDUs on a PDCH supporting MuxPDU Type 5. If the PDCH is connected, the MAC layer encapsulates the SDUs with a MuxPDU Type 5 header and an extension header having encapsulation information, thereby generating MuxPDUs of MuxPDU Type 5. A physical layer transmits the MuxPDUs on the PDCH.

16 Claims, 8 Drawing Sheets

FIG.1
(BACKGROUND ART)

MUXPDU TYPE 1

| DATA RATE(bps) | HEADER | PRIMARY TRAFFIC (bit/block) | SIGNALING (bit/block) | SECONDARY TRAFFIC (bit/block) |
|---|---|---|---|---|
| 9600 | 0000-1111 | 0 - 171 | 0 - 168 | 0 - 168 |
| 4800 | - | 80 | 0 | 0 |
| 2400 | - | 40 | 0 | 0 |
| 1200 | - | 16 | 0 | 0 |

MUXPDU TYPE 2

| DATA RATE(bps) | HEADER | PRIMARY TRAFFIC (bit/block) | SIGNALING (bit/block) | SECONDARY TRAFFIC (bit/block) |
|---|---|---|---|---|
| 14400 | 00000-11000 | 0 - 266 | 0 - 262 | 0 |
| 7200 | 0000-1110 | 0 - 124 | 0 - 121 | 0 |
| 3600 | 000-111 | 0 - 54 | 0 - 52 | 0 |
| 1800 | 0-1 | 0 - 20 | 0 | 0 |

MUXPDU TYPE 3

| SID | RESERVED | TRAFFIC (bit/block) |
|---|---|---|
| 001-111 | 000 | 0-538 |

MUXPDU TYPE 4

| DATA RATE(bps) | SIGNALING (bit/block) |
|---|---|
| 9600 | 24 |

MUXPDU TYPE 5

| SID | RESERVED | LENGTH INDICATOR | LENGTH(bit) | TRAFFIC (bit/block) |
|---|---|---|---|---|
| 000-110 | 0 | 00 | - | variable |
| 000-110 | 0 | 01 | 8 | 8 x LEN + 2 |
| 000-110 | 0 | 10 | 16 | 8 x LEN + 2 |
| 111 | 0 | 11 | - | - |

| MUXPDU TYPE 5 HEADER ||||  PAYLOAD |
| SID | EXTENSION INDICATOR | LENGTH INDICATOR | LEN | |
| --- | --- | --- | --- | --- |
| 000-111 | 0 | 00 | – | Variable |
| 000-111 | 0 | 01 | 8 bits | 8 x LEN + 2 |
| 000-111 | 0 | 10 | 16 bits | 8 x LEN + 2 |
| 000-111 | 0 | 11 | – | 378 |
| 000-110 | 1 | 00 | – | Variable |
| 000-110 | 1 | 01 | 8 bits | 8 x LEN + 2 |
| 000-110 | 1 | 10 | 16 bits | 8 x LEN + 2 |
| 000-110 | 1 | 11 | – | 368 |

FIG.4

| FIELD | LENGTH (BITS) | DESCRIPTIVE VALUE |
|---|---|---|
| EXTENSION TYPE | 2 | 00-RESERVED<br>01-ENCAPSULATION HEADER USED<br>10-RESERVED<br>11-RESERVED |
| ENCAPSULATION TYPE | 2 | 00-RESERVED<br>01-MUXPDU TYPE 1<br>10-MUXPDU TYPE 2<br>11-MUXPDU TYPE 4 |
| ENCAPSULATION UNIT SIZE | 2 | 00-FULL RATE<br>01-1/2 RATE<br>10-1/4 RATE<br>11-1/8 RATE |
| RESERVED | 4 | 0000 |

FIG.5

|  | SIGNALING INFORMATION | | | PRIMARY TRAFFIC | | SECONDARY TRAFFIC | |
|---|---|---|---|---|---|---|---|
|  | MUXPDU TYPE 1 | MUXPDU TYPE 2 | MUXPDU TYPE 4 | MUXPDU TYPE 1 | MUXPDU TYPE 2 | MUXPDU TYPE 1 | MUXPDU TYPE 2 |
| FULL RATE | 168 | 262 | 24 | 171 | 266 | 168 | 262 |
| 1/2 RATE | - | 121 | - | 80 | 124 | - | 121 |
| 1/4 RATE | - | 52 | - | 40 | 54 | - | 52 |
| 1/8 RATE | - | - | - | 16 | 20 | - | 20 |

METHOD AND APPARATUS FOR TRANSMITTING DIFFERENT DATA TYPES IN A WIRELESS PACKET DATA COMMUNICATION SYSTEM

PRIORITY

This application claims priority under 35 U.S.C. § 119 to an application entitled "Method and Apparatus for Encapsulating Packet Data Unit in a Wireless Packet Data Communication System" filed in the Korean Industrial Property Office on Jul. 29, 2002and assigned Ser. No. 2002-44753, the contents of which are incorporated herein by reference.

BACKGROUND OF THE INVENTION

1. Field of the Invention

The present invention relates generally to a wireless packet data communication system, and in particular, to a method and apparatus for transmitting signaling information for call control and radio link protocol (RLP) control on a packet data channel (PDCH).

2. Description of the Related Art

Code division multiple access (CDMA) mobile communication systems have been developed from the $2^{nd}$ generation (2G) standards focusing mainly on voice service to the $3^{rd}$ generation (3G) standards that enable additional high-rate data service. Since 3G CDMA mobile communication systems support up to 2 Mbps, they transmit up to 256 times more data than 2G CDMA mobile communication systems that support only 9.6 or 14.4 kbps. The high-rate data transmission capability enables various services including high-quality voice service, transmission of moving pictures, Internet browsing, etc.

An initially developed CDMA2000 mobile communication system (CDMA2000 1×) transmits packet data mainly on a supplemental channel (SCH), voice requiring high reliability on a fundamental channel (FCH), and signaling information on a dedicated control channel (DCCH). This is because the FCH and DCCH are designed to have better quality than the SCH.

An advanced 3G CDMA mobile communication that has been proposed particularly to support both voice and high-rate packet data services, CDMA2000 1×EVDV (Evolution in Data and Voice), adopts a PDCH for reliable transmission of voice and packet data at higher rate. Since the PDCH is as good in quality as the FCH and the DCCH, it can deliver information requiring high-rate transmission, for example, signaling information for call control and RLP control together with voice and packet data in the CDMA2000 1×EVDV system. Because existing systems generate signaling information in data units transmittable on the FCH or the DCCH, if a function is added to the systems to generate signaling information in a novel data unit type for transmission on the PDCH and determine whether the current channel is the FCH, DCCH, or PDCH, system functions are complicated and generation of control information to be additionally checked increases time delay and system load.

Moreover, the PDCH is characterized by its variable rate depending on the radio environment of a mobile station (MS) being serviced and the quality of service (QoS) of the service. This implies that one PDCH frame delivers a variable amount of data. In a typical layered communication system, information about the data rate of a physical channel connected for service is managed in a lower layer, without being delivered to an upper layer. Therefore, the upper layer generates data units of a fixed length, each data unit including segmented data, by segmenting a transmission data stream. The lower layer transmits a predetermined number of data units in a physical layer frame of which the length is determined according to the current data rate.

Because it is relatively short, signaling information cannot fill an entire physical layer frame of the PDCH in most cases. Accordingly, it is required that the signaling information be transmitted effectively on the PDCH without modifying existing system configurations, and still minimizing the physical layer frame consumption.

SUMMARY OF THE INVENTION

It is, therefore, an object of the present invention to provide a method and apparatus for effectively transmitting signaling information on a PDCH in a wireless packet data communication system.

It is another object of the present invention to provide a method and apparatus for encapsulating signaling information and transmitting it on a PDCH in a wireless packet data communication system.

It is a further object of the present invention to provide a method and apparatus for encapsulating a data unit suitable for transmission on a different physical channel to be transmitted on a PDCH in a wireless packet data communication system.

The above and other objects are achieved by providing a method and apparatus for transmitting data of different first data types on a physical channel supporting a second data type in a wireless packet data communication system. In the method, a data unit of a first data type is generated including signaling information and RLP control information, and it is determined whether the data unit of the first data type is to be transmitted in the second data type. If the data unit of the first data type is to be transmitted in the second data type, a data unit of the second data type is generated by attaching header information that is supporting the second data type to the data unit of the first data type.

In the apparatus, a first layer device generates a data unit of a first data type including signaling information and RLP control information. A second layer device determines whether the data unit of the first data type is to be transmitted in the second data type, and if the data unit of the first data type is to be transmitted in the second data type, generates a data unit of the second data type by attaching header information that is supporting the second data type to the data unit of the first data type.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention pertains to modification of a data unit, which is transmittable on a different physical channel, to a form suitable for transmission on a PDCH in a wireless packet data communication system. Particularly, call control signaling information and RLP control information, which are intended to be transmitted on an FCH or a DCCH, are encapsulated with PDCH headers and alternately transmitted on the PDCH.

It is to be appreciated herein that while the following description is made in the context of a CDMA2000 system, particularly a 1×EVDV system, which is a synchronous CDMA2000 system proposed by the $3^{rd}$ generation partnership project (3GPP2), the present invention is applicable to other mobile communication systems having similar technological background and channel structure.

Figure 1:
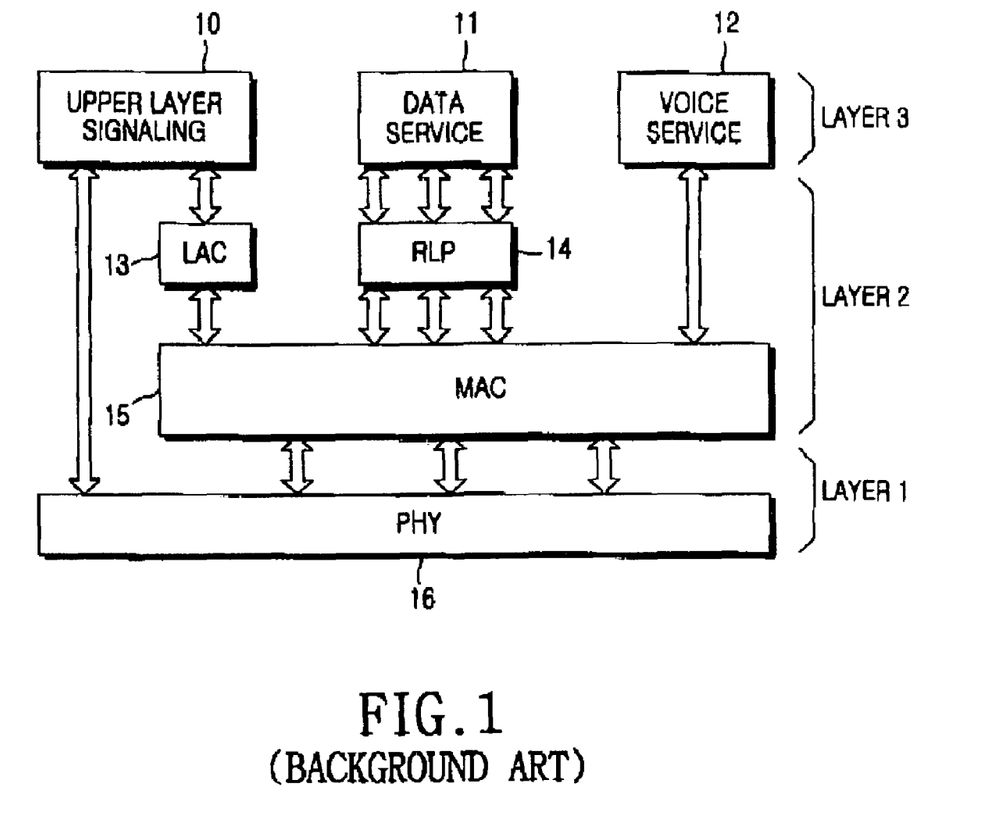
FIG. 1 illustrates architecture of protocol layers in a CDMA2000 system, to which the present invention is applied.

FIG. 1 is a layered protocol structure for an open system interconnection (OSI) reference model in a CDMA2000 system, to which the present invention is applied. CDMA2000 is a generic term that refers to both CDMA 2000 1×and CDMA 2000 1×EVDV, and a layer refers to software or hardware that performs a corresponding layer function.

Referring to FIG. 1, the CDMA2000 system is comprised of an upper signaling layer 10, a data service layer 11, a voice service layer 12, a link access control (LAC) layer 13, a Radio Link Protocol (RLP) layer 14, a media access control (MAC) layer 15, and a physical (PHY) layer 16. The upper signaling layer 10, the data service layer 11, and the voice service layer 12 correspond to OSI layer 3 to OSI layer 7. The LAC layer 13, the RLP layer 14, and the MAC layer 14 correspond to OSI layer 2, and the physical layer 16 corresponds to OSI layer 1.

The typical CDMA2000 system discriminates the functions of an MS, a base transceiver subsystem (BTS), and a base station controller (BSC) by layers. That is, the BTS controls functions in layer 1, and the BSC controls functions in layer 2 to layer 7.

The upper signaling layer 10 processes signaling information for call control and PHY layer interfacing. The data service layer 11 and the voice service layer 12 process traffic for data and voice services, respectively.

The LAC layer 13 generates a control message by attaching a header related with authentication, sequencing and addressing, a report field related with radio link quality, and a length field, to the signal information from the upper signaling layer 10. In addition, the LAC 13 segments the control message to be transmittable in the MAC layer 15, and generates data units by attaching start of message (SOM) bits, which indicate the start or continuation of a message, to each data segment. The RLP layer 14 generates data units by segmenting a data stream from the data service layer 11 to a size transmittable in the PHY layer 16 and assigning a sequence number to each data segment. The RLP layer 14 also generates data units out of RLP control information. The data generated in the LAC layer 13 and the RLP layer 14 is called service datagram units (SDUs).

The MAC layer 15 attaches a multiplex (MUX) header, which corresponds to a physical channel transmission type, to an SDU that is received from the LAC layer 13 or the RLP layer 14. The MAC layer 15 is also called a MUX layer in the sense that it multiplexes signaling and traffic data. A data unit containing the MUX header is called a MuxPDU.

The MAC layer 15 forms a physical channel frame with at least one MuxPDU according to the type and data rate of a physical channel connected for service. The PHY layer 16 then transmits the physical channel frame after coding, modulation, etc., to the other party.

The PHY layer 16 transmits to the MAC layer 14 at least one MuxPDU included in a physical channel frame from the other party. The MAC layer 15 then extracts an SDU from the MuxPDU by analyzing its MUX header and transmits the SDU to a corresponding layer.

The physical channels used in the PHY layer 16 for packet data service are summarized as follows.

DCCH: dedicatedly delivers control information of Layer 3 and Layer 2 to a particular MS;

FCH: delivers traffic data at low rate like the FCH of IS-95;

SCH: delivers traffic data at low rate like the SCH of IS-95; and

PDCH: stably delivers traffic data at high rate.

Figure 2:
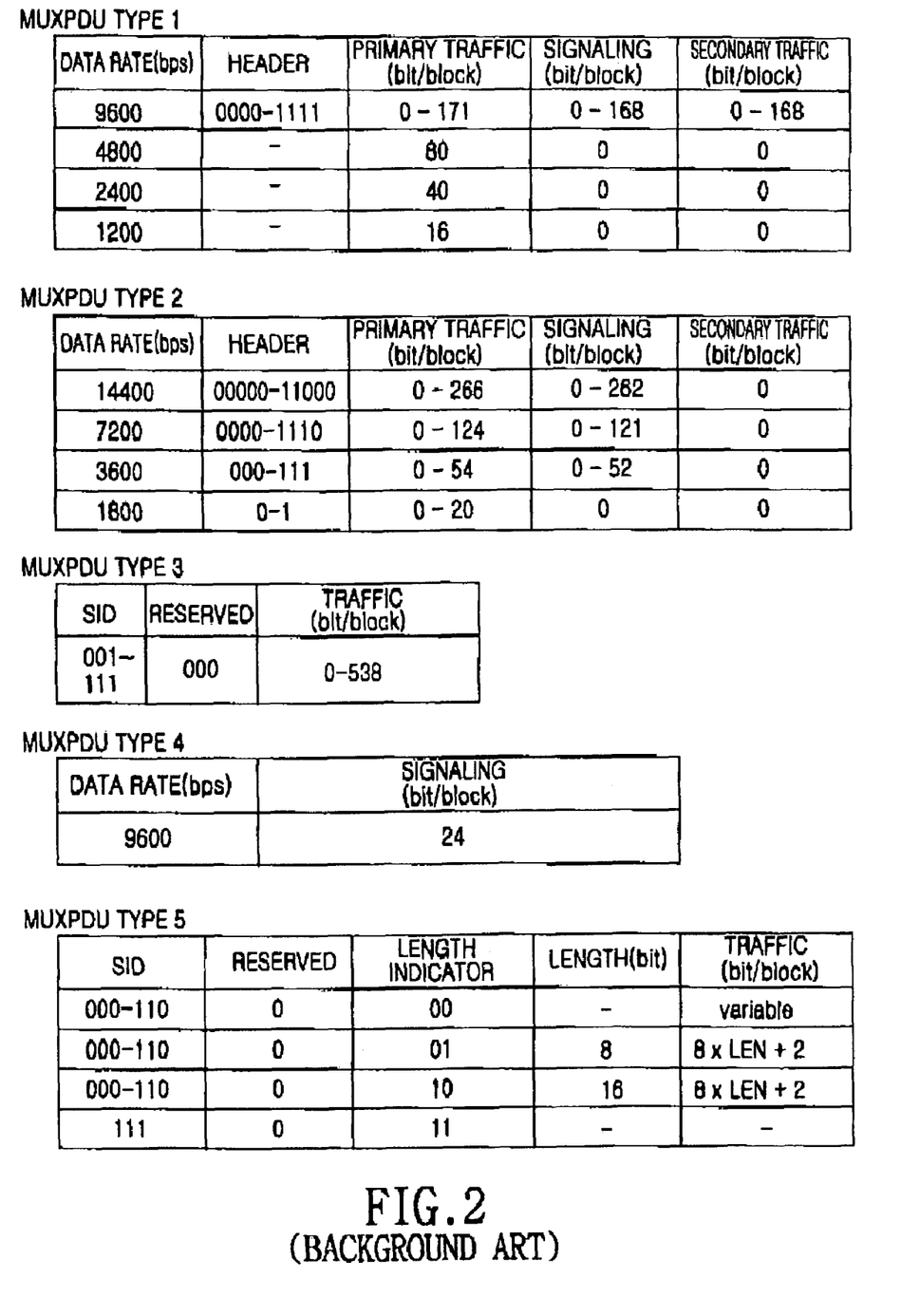
FIG. 2 illustrates multiplex packet data unit (MuxPDU) Types used in the CDMA2000 system.

The MAC layer 15 uses a plurality of MuxPDU types to support the abovedescribed physical channels in the CDMA 2000 system. FIG. 2 schematically illustrates the formats of the MuxPDU Types for CDMA2000 1×and CDMA2000 1×EVDV.

Referring to FIG. 2, MuxPDU Type 1 is used to transmit signaling information, primary traffic and secondary traffic on a physical channel that supports 1200 to 9600 bps. MuxPDU Type 2 is intended to support up to 14400 bps for the same use as MuxPDU Type 1. MuxPDU Type 1 and MuxPDU Type 2 apply to the FCH and DCCH to deliver control information and traffic data. The primary and secondary traffics refer to RLP control information generated from the RLP layer. They are discriminated from call control signaling information generated from the upper signaling layer. Primary and secondary indicate priority levels of control information.

MuxPDU Type 3 transmits traffic data from the RLP layer on the SCH at 14400 bps or lower. MuxPDU Type 4 is for transmitting preset control messages on the FCH.

Payload size for MuxPDU Types 1, 2, and 4 is determined according to the size of signaling information or RLP control information in corresponding layers. A receiver can detect the size of payload from a received MuxPDU itself. MuxPDU Type 5 is used to support a variable data rate for the PDCH in the CDMA2000 1×EVDV system. It additionally includes a field indicating payload size.

Referring to FIG. 2, a MuxPDU of MuxPDU Type 5 contains a MuxPDU Type 5 header and payload to transmit traffic data from the RLP layer on the PDCH. The MuxPDU Type 5 header includes a 3-bit Service Identifier (SID), a 1-bit Reserved and a 2-bit Length Indicator. The Length Indicator indicates the presence or absence of the following Length (LEN) and the length of LEN. LEN specifies payload size in 8 or 16bits. Hence, the MuxPDU Type 5 header is 6, 14, (including an 8-bit LEN), or 22 bits (including a 16-bit LEN).

Describing the values of the SID, 000 indicates signaling, 001 to 110 indicates service indexes and 111 indicates null service. In the Length Indicator, 00 indicates an absence of a LEN, 01 indicates that the LEN is 8 bits, 10 indicates that the LEN is 16 bits, and 11 indicates that payload size is fixed.

In the CDMA2000 system, upon call setup and connection of a physical channel, the configuration information of the physical channel is transmitted to the LAC layer, the RLP layer and the MAC layer. The LAC layer and the RLP layer generate SDUs in corresponding MuxPDU Types according to the physical channel configuration information. The MAC layer then attaches headers, which correspond to the MuxPDU Types, to the SDUs and transmits the resulting MuxPDUs to the PHY layer.

More specifically, the RLP layer generates an SDU by segmenting a data stream to a size corresponding to MuxPDU Type 3 or MuxPDU Type 5, or generates SDUs of a size corresponding to MuxPDU Type 1, 2, or 4 from RLP control information. If the maximum rate of a physical channel set in the physical channel configuration information is 9600 bps, MuxPDU Type 1 is used. If the maximum rate is 14400 bps, MuxPDU Type 2 is selected, and MuxPDU Type 4 is used for a preset control message.

The MAC layer then generates a MuxPDU by attaching a header of a corresponding MuxPDU Type to the SDU generated from the LAC layer or the RLP layer. If the FCH or SCH is currently connected, the MAC layer attaches a header of MuxPDU Type 1, 2, or 4 to the SDU of MuxPDU Type 1, 2, or 4. If the PDCH is currently connected, the MAC layer generates a MuxPDU of MuxPDU Type 5 from the SDU of MuxPDU Type 1, 2, or 4 by encapsulating the SDU with a MuxPDU Type 5 header. The encapsulation is done to relieve the constraint of determining whether the current physical channel is the PDCH when generating SDUs from signaling information and RLP control information in the LAC layer and the RLP layer.

A reserved bit in the MuxPDU Type 5 header is used to notify whether a MuxPDU of MuxPDU Type 5 has an encapsulated SDU of a different MuxPDU Type.

Figure 3:
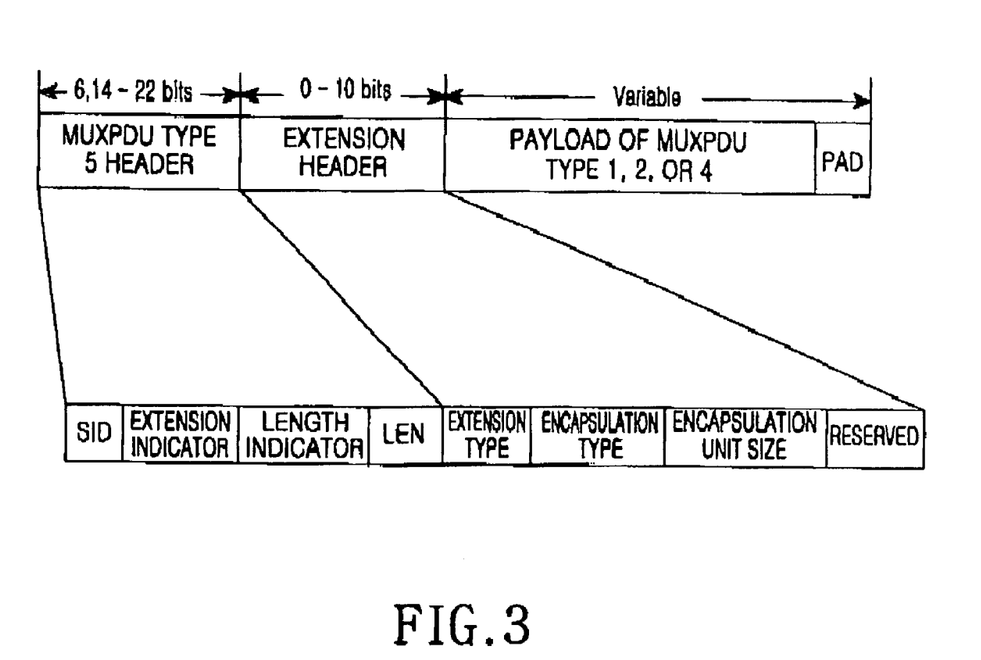
FIG. 3 illustrates a structure of a MuxPDU of MuxPDU Type 5 according to an embodiment of the present invention.

FIG. 3 illustrates a MuxPDU of MuxPDU Type 5 that encapsulates an SDU of a different MuxPDU Type. The MuxPDU contains a MuxPDU Type 5 header of 6, 14, or 22 bits, a 10-bit extension header, and payload. The MuxPDU Type 5 header is comprised of a 3-bit SID, a 1-bit Extension Indicator, a 2-bit Length Indicator, and a 0, 8, or 16-bit LEN. As described above, the Length Indicator indicates the presence or absence of the following LEN and the length of the LEN. The LEN specifies payload size in bytes. The extension header exists only if Extension Indicator is 1, in order to extend the use of PDUs of MuxPDU Type 5.

Figure 4:
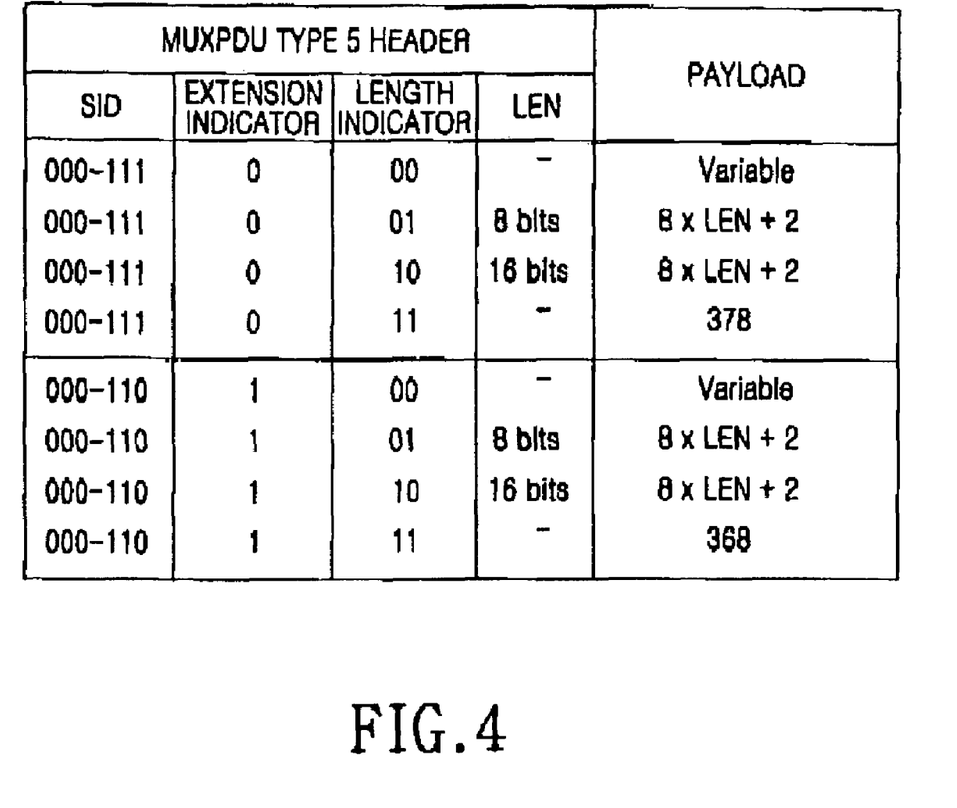
FIG. 4 is a table illustrating a structure of a MuxPDU Type 5 header in detail.

FIG. 4 illustrates the MuxPDU Type 5 header in more detail. Referring to FIG. 4, if the SID is 000, it indicates signaling. If the SID is 001 to 110, it indicates a corresponding service index. If the SID is 111, it indicates non-service. In the case of the Length Indicator, 00 indicates the absence of the LEN, 01 indicates that the length of the LEN is 8 bits, 10 indicates that the LEN is 16 bits, and 11 indicates that the payload size is fixed. When the LEN is omitted, the payload size is variable according to the rate of the PDCH. If the Extension Indicator is 0, the extension header is absent, and if it is 1, the extension header follows the LEN.

For a MuxPDU of 384 bits transmittable on the PDCH, if the Extension Indicator is 0 and the Length Indicator is 11, which implies the absence of the extension header and LEN, the payload size is fixed to 378 (384-6) bits. With the extension header added (Extension Indicator set to 1 and Length indicator set to 11), the payload size is fixed to 368 (384-10-6) bits. With both the extension header and LEN included (Extension Indicator set to 1 and Length Indicator set to 01 or 10), LEN indicates the total length of the extension header and the payload.

Figure 5:
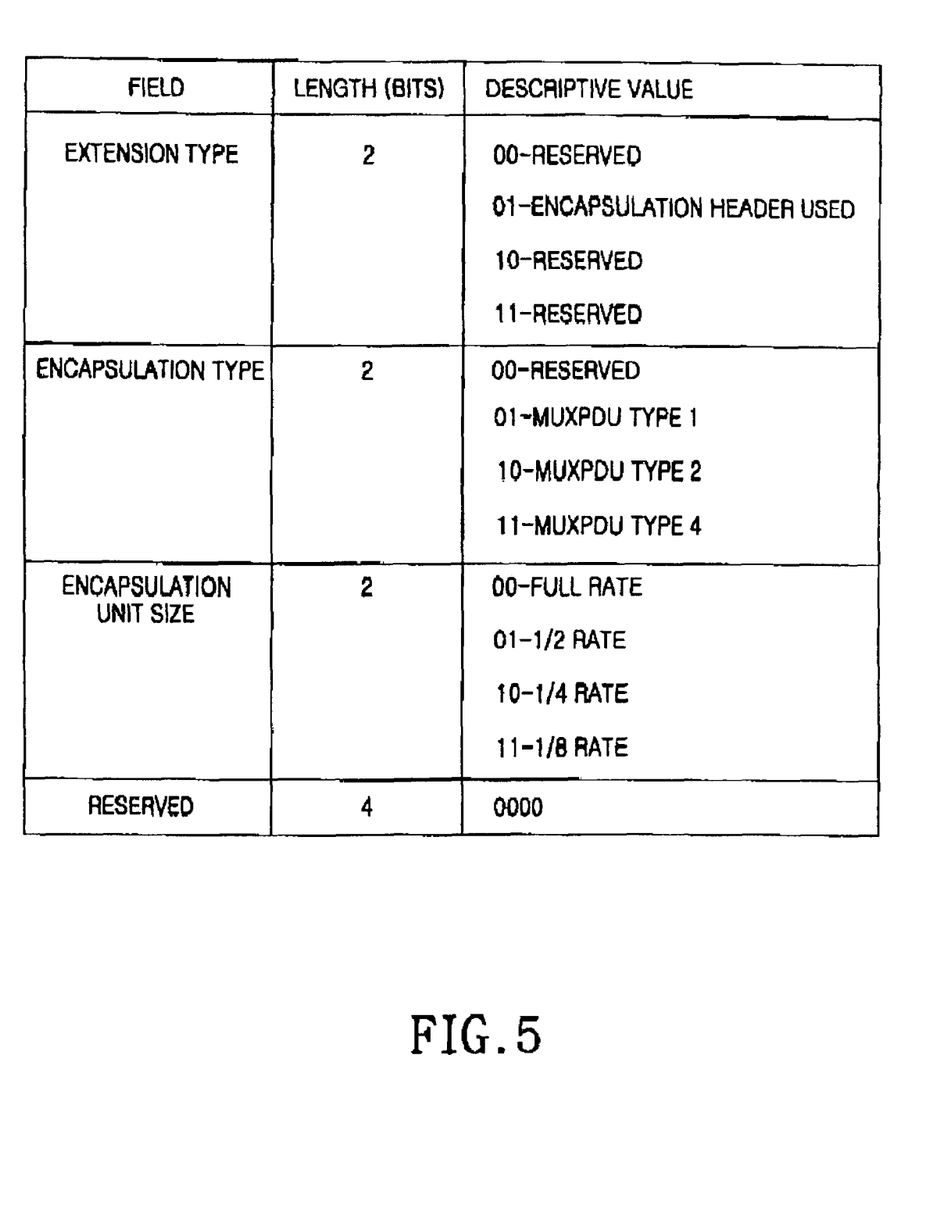
FIG. 5 illustrates a structure of an extension header illustrated in FIG. 3 in detail.

FIG. 5 illustrates the extension header in more detail. Referring to FIG. 5, the extension header starts with a 2-bit Extension Type indicating the extended use of MuxPDU Type 5. If a MuxPDU of MuxPDU Type 5 encapsulates an SDU of MuxPDU Type 1, 2, or 4, the Extension Type is set to indicate encapsulation, for example, 01. The extension header then further includes a 2-bit Encapsulation Type and a 2-bit Encapsulation Size. The last 4 bits of the extension header is for byte arrangement. Encapsulation Type indicates the MuxPDU Type of SDUs that the following payload has. If Encapsulation Type is 01, the payload is of MuxPDU Type 1, if it is 10, the payload is of MuxPDU Type 2 and if it is 11, the payload is of MuxPDU Type 4. Encapsulation Unit Size indicates the size of a MuxPDU Type 1 SDU or a MuxPDU Type 2 SDU in the payload for the FCH that supports a plurality of rates, full rate, ½ rate, ¼ rate and ⅛ rate. For example, 00 indicates the full rate, 01 indicates the ½ rate, 10 indicate rate and 11 indicates the ⅛ rate. Referring to FIG. 2, a MuxPDU Type 1 SDU containing signaling information is 168 bits at the full rate, and a MuxPDU Type 2 SDU containing primary traffic is 124 bits at the ½ rate.

Figure 6:
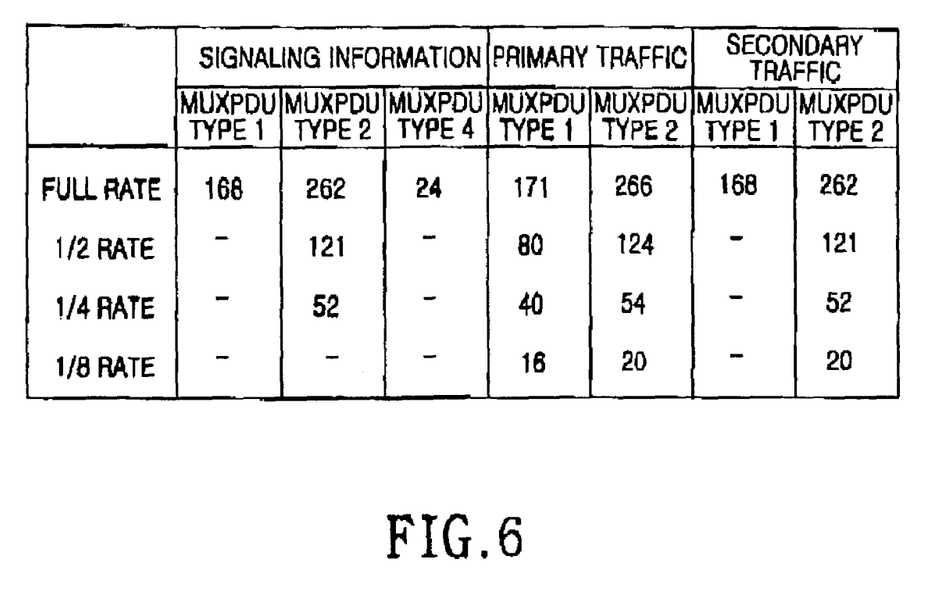
FIG. 6 is a table illustrating sizes of service datagram units (SDUs) for MuxPDU Types 1, 2 and 4.

FIG. 6 illustrates sizes of SDUs of MuxPDU Types 1, 2 and 4. This table lists the sizes and types of homogeneous data blocks that are transmitted in SDUs at physical channel rates because mixed transmission of signaling, primary, and secondary traffic in an SDU increases overhead for discriminating the traffics. Referring to FIG. 6, signaling information of MuxPDU Types 1, 2, and 4 at the full rate, is 168, 262, and 24 bits, respectively. Signaling information of MuxPDU Type 2 is 121 bits at the ½ rate and 52 bits at the ¼ rate. MuxPDU Types 1 and 4 support only the full rate. Primary traffic of MuxPDU Type 1 and MuxPDU Type 2 is 171 and 266 bits at the full rate, 80 and 124 bits at the ½ rate, 40 and 54 bits at the ¼ rate, and 16 and 20 bits at the ⅛ rate, respectively. MuxPDU Type 1 supports only the full rate for secondary traffic of 168 bits. Secondary traffic of MuxPDU Type 2 is 262 bits at the full rate, 121 bits at the ½ rate, 52 bits at the ¼ rate, and 20 bits at the ⅛ rate.

Figure 7:
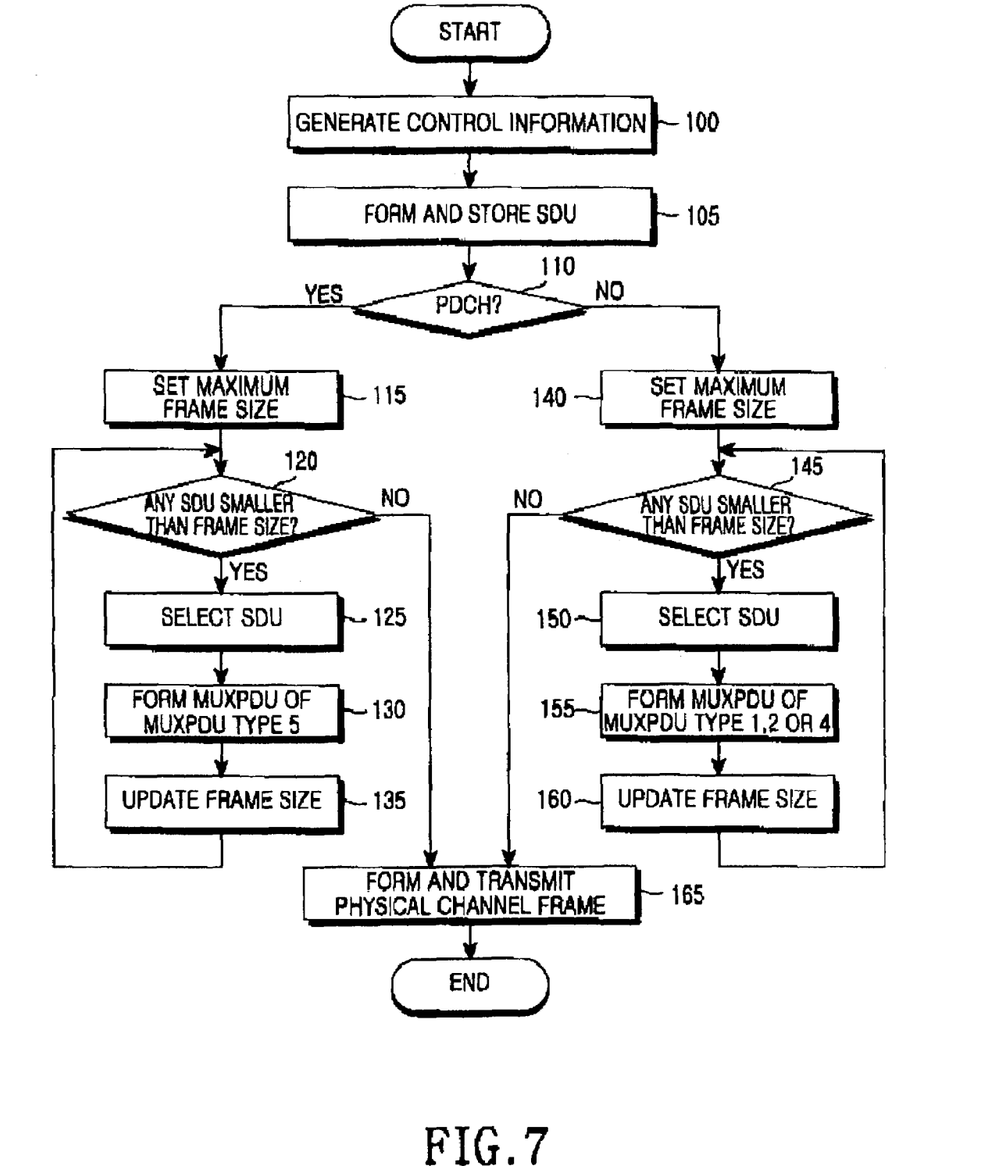
FIG. 7 is a flowchart illustrating an operation for transmitting SDUs of MuxPDU Type 1, 2, or 4 in MuxPDU Type 5 according to the embodiment of the present invention.

FIG. 7 is a flowchart illustrating encapsulation of an SDU of MuxPDU Type 1, 2 or 4 in MuxPDU Type 5 according to the embodiment of the present invention. It is to be noted in the following description that steps 100 and 105 are performed in the LAC layer or the RLP layer, and steps 110 to 160 are performed in the MAC layer.

Referring to FIG. 7, upon generation of control information such as signaling information and RLP control information in step 100, the LAC layer and the RLP layer form SDUs of MuxPDU Type 1, 2 or 4 from the control information and store them in a buffer disposed between the LAC and RLP layers and the MAC layer in step 105. As illustrated in FIG. 6, the SDUs are variable in size depending on the rate of the FCH or the DCCH. The SDU sizes are determined according to the size of the control information in the LAC and RLP layers.

The MAC layer determines whether the PDCH is to transmit the data units, that is, whether the PDCH has been connected in step 110. If the PDCH has been connected, the MAC layer proceeds to step 115. Otherwise, the MAC layer proceeds to step 140. In step 115, the MAC layer sets an available frame size for transmission on the PDCH to the maximum physical frame size available at the rate of the PDCH, for example, 384 bits. The MAC layer determines whether there is an SDU smaller than the frame size in the buffer in step 120. If an SDU smaller than the frame size is present, the MAC layer selects the SDU in step 125. Since the LAC and RLP layers always form SDUs smaller than the physical layer frame size, the MAC layer always selects such an SDU at the beginning.

In step 130, the MAC layer forms a MuxPDU of Mux-PDU Type 5 by attaching corresponding headers to the selected SDU. Specifically, the MAC layer attaches to the SDU a MuxPDU Type 5 header with the Extension Indicator set to 1 and then an extension header with the Extension Type set to 1 and the Encapsulation Type and the Encapsulation Unit Size set to the MuxPDU Type and size of the SDU, respectively. The MAC layer reduces the available frame size to the size of the PDU in step 135 and returns to step 120.

If there is another SDU smaller than the updated available frame size in the buffer after the first SDU is selected, the MAC layer attaches corresponding headers for MuxPDU Type 5 to the SDU like the first SDU. The available frame size is then updated to the size of the second MuxPDU.

The above procedure is repeated until there is no SDU smaller than the available frame size in the buffer. Then the MAC layer forms a physical layer frame with the at least one MuxPDU and pads the remaining empty part of the physical layer with Os in step 165.

When the PDCH is not connected in step 110, the MAC layer sets the available frame size to a maximum size available at the rate of the FCH or the SCH, for example, 172 bits in step 140. The MAC layer determines whether there is an SDU smaller than the available frame size in the buffer in step 145. If an SDU smaller than the frame size is present, the MAC layer selects the SDU in step 150.

In step 155, the MAC layer forms a ultimate MuxPDU of MuxPDU Type 1, 2 or 4 by attaching a corresponding header to the selected SDU. The MAC layer then reduces the available frame size to the size of the resulting MuxPDU in step 160 and returns to step 145.

If there is another SDU less than the updated frame size in the buffer after the first SDU is selected, the MAC layer forms a MuxPDU of MuxPDU Type 1, 2, or 4 by attaching a corresponding header to the selected SDU. The MAC layer then reduces the frame size to the size of the resulting MuxPDU.

The above procedure is repeated until there is no SDU smaller than the available frame size in the buffer. Then the MAC layer forms a physical layer frame with the at least one MuxPDU and pads the remaining empty part of the physical layer with Os in step 165.

It can be further contemplated as another embodiment of the present invention that the maximum physical channel frame size is set to the basic frame size of the PDCH. In this embodiment, the frame size of the PDCH supporting a variable rate is a multiple of the basic frame size. For example, the PDCH supports a physical frame having one of 1/2/4/6/8/10 multiples of the basic frame size. The physical frame then contains one or more basic frames according to a data rate.

Thus, the MAC layer forms one physical channel frame by connecting a predetermined number of 384-bit basic frames in step 165. The constraint of periodically checking the rate of the physical channel is relieved by configuring the MAC layer such that a basic frame and a physical channel frame are formed separately. For example, a BSC forms a basic frame and a BTS forms a physical channel frame.

Figure 8:
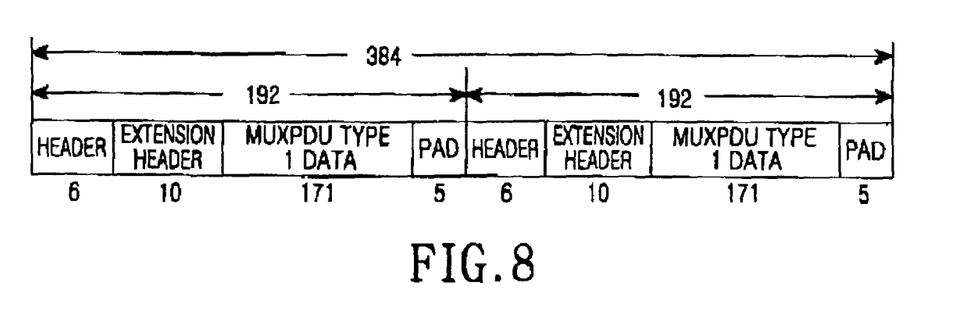
FIGS. 8, 9 and 10 illustrate examples of physical channel frames, each containing a plurality of MuxPDUs according to the embodiment of the present invention.
Figure 9:
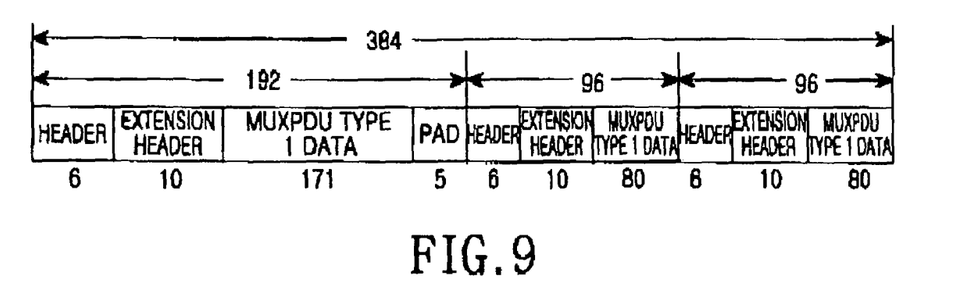
Figure 10:
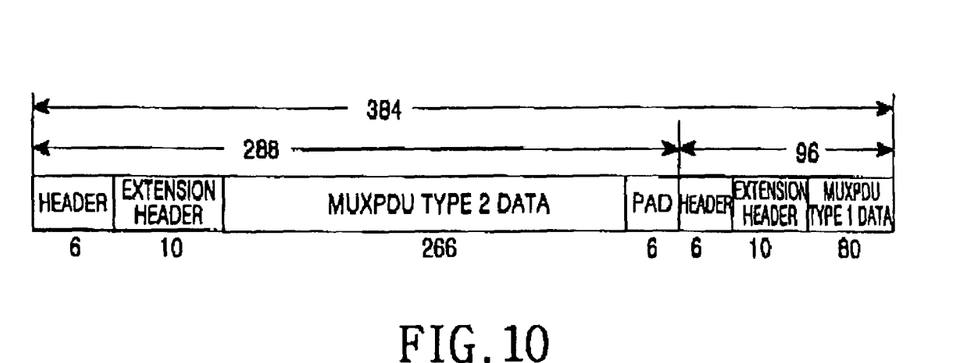

FIGS. 8, 9 and 10 illustrate examples of physical channel frames, each including a plurality of MuxPDUs according to the present invention. Here, it is assumed that the size of a physical channel frame is 384 bits and the LEN is omitted.

Referring to FIG. 8, the physical channel frame contains two 192-bit MuxPDUs, each encapsulating a 171-bit SDU of MuxPDU Type 1 at the full rate. The 171-bit SDU is primary traffic as illustrated in FIG. 6.

Referring to FIG. 9, the physical channel frame contains one 192-bit MuxPDU encapsulating a 171-bit SDU of MuxPDU Type 1 at the full rate and two 96-bit ,MuxPDUs, each encapsulating an 80-bit SDU of MuxPDU Type 1 at the half rate.

Referring to FIG. 10, the physical channel frame contains one 288-bit MuxPDU encapsulating a 266-bit SDU of MuxPDU Type 2 and one 96-bit MuxPDU encapsulating an 80-bit SDU of MuxPDU Type 1. Both the 266-bit SDU and the 80-bit SDU are primary traffic.

In accordance with the present invention, as described above, SDUs of MuxPDU Types 1, 2, and 4 suitable for transmission on the FCH and SCH are encapsulated with headers corresponding to MuxPDU Type 5, for transmission on the PDCH in a CDMA2000 1×EVDV system. Therefore, the LAC and RLP layers generate SDUs of MuxPDU Types 1, 2 and 4, regardless of the type of a physical channel. Consequently, signaling information and RLP control information can be transmitted on the PDCH without modifying the configurations of the LAC and RLP layers.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting data of a plurality of different first data types on a physical channel supporting a second data type in a wireless packet data communication system, comprising the steps of:
   generating a data unit of a first data type;
   determining whether the data unit of the first data type is to be transmitted in the second data type; and
   generating a data unit of the second data type by attaching multiplexed (MUX) header information supporting the second data type to the data unit of the first data type, if the data unit of the first data type is to be transmitted in the second data type, and comprising:
      forming a first header, which is specific to the second data type, in the data unit of the second data type that comprises an extension indicator for indicating whether a second header is present;
      forming the second header comprising information about the data unit of the first data type, after the first header; and
      forming a payload comprising the data unit of the first data type, after the second header.

2. The method of claim 1, wherein the data unit of a first data type includes signal information and RLP control information.

3. The method of claim 1, wherein the first header comprises:
   a first information field for specifying a service identifier of the data unit of the first data type;
   a second information field for indicating whether a length of payload size is present and;
   a third information field for specifying a size of the payload.

4. The method of claim 1, wherein the second header comprises:

a extension type field set to indicate encapsulation when the data unit of the second data type encapsulates a data unit of a different data type from the second data type;

a first information field for indicating the first data type; and a second information field for specifying a size of the data unit of the first data type.

5. The method of claim 1, further comprising the step of generating an ultimate data unit of the first data type by attaching header information supporting the first data type to the data unit of the first data type, if the data unit of the first data type is not to be transmitted in the second data type.

6. The method of claim 5, wherein the step of generating the ultimate data unit of the first data type comprises the steps of:

forming a first header, which is specific to the first data type, to the data unit of the first data type; and forming a payload including the data unit of the first data type after the first header.

7. The method of claim 6, wherein the first header comprises:

a first information field for specifying a service identifier of the data unit of the first data type;

a second information field for specifying a size of the payload; and a third information field for specifying whether the second information field is present, and if the second information field is present, the length of the second information field.

8. The method of claim 1, further comprising the steps of:

inserting at least one multiplex unit in a physical channel frame of which a size is determined according to a rate of the physical channel supporting the second data type; and transmitting the physical channel frame on the physical channel, that is a Packet Data Channel (PDCH).

9. An apparatus for transmitting data of a plurality of different first data types on a physical channel supporting a second data type in a wireless packet data communication system, comprising:

a first layer device for generating a data unit of a first data type; and a second layer device for determining whether the data unit of the first data type is to be transmitted in the second data type, and generating a data unit of the second data type by attaching multiplexed (MUX) header information supporting the second data type to the data unit of the first data type, if the data unit of the first data type is to be transmitted in the second data type;

wherein the second layer device forms a first header, which is specific to the second data type, in the data unit of the second data type that comprises an extension indicator for indicating whether a second header is present. Forms the second header comprising information about the data unit of the first data type, after the first header, and forms a payload comprising the data unit of the first data type, after the second header.

10. The apparatus of claim 9, wherein the data unit of a first data type includes signal information and RLP control information.

11. The apparatus of claim 9, wherein the first header comprises:

a first information field for specifying a service identifier of the data unit of the first data type;

a second information field for indicating whether a length of payload size is present and;

a third information field for specifying the length of payload size.

12. The apparatus of claim 9, wherein the second header comprises:

a extension type field set to indicate encapsulation when the data unit of the second data type encapsulates a data unit of a different data type from the second data a first information field for indicating the first data type; and a second information field for specifying a size of the data unit of the first data type.

13. The apparatus of claim 10, wherein the second layer device generates an ultimate data unit of the first data type by attaching header information supporting the first data type to the data unit of the first data type, if the data unit of the first data type is not to be transmitted in the second data type.

14. The apparatus of claim 13, wherein the second layer device forming a first header, which is specific to the first data type, to the ultimate data unit of the first data type, and forms a payload including the data unit of the first data type after the first header.

15. The apparatus of claim 14, wherein the first header comprises:

a first information field for specifying a service identifier of the data unit of the first data type;

a second information field for specifying a size of the payload; and a third information field for specifying whether the second information field is present, and if the second information field is present, the length of the second information field.

16. The apparatus of claim 9, further comprising a third layer device for inserting at least one multiplex unit in a physical channel frame of which a size is determined according to a rate of the physical channel supporting the second data type, and transmitting the physical channel frame on the physical channel, that is a Packet Data Channel (PDCH).

* * * * *